United States Patent
Fehlmann et al.

(10) Patent No.: US 10,874,482 B2
(45) Date of Patent: Dec. 29, 2020

(54) MIXING CAPSULE FOR DENTAL MATERIAL, AND METHOD FOR PRODUCING DENTAL MATERIAL

(71) Applicant: Rock Dental AG, Altendorf (CH)

(72) Inventors: Marc Fehlmann, Altendorf (CH); David Bensoussan, Altendorf (CH)

(73) Assignee: Rock Dental AG, Altendorf (CH)

( * ) Notice: Subject to any disclaimer, the term of this patent is extended or adjusted under 35 U.S.C. 154(b) by 230 days.

(21) Appl. No.: 15/546,588

(22) PCT Filed: Jan. 21, 2016

(86) PCT No.: PCT/IB2016/050284
§ 371 (c)(1),
(2) Date: Jul. 26, 2017

(87) PCT Pub. No.: WO2016/125036
PCT Pub. Date: Aug. 11, 2016

(65) Prior Publication Data
US 2018/0000560 A1    Jan. 4, 2018

(30) Foreign Application Priority Data

Feb. 4, 2015    (CH) .......................................... 145/15

(51) Int. Cl.
*B65D 81/32*  (2006.01)
*A61C 5/66*   (2017.01)
(Continued)

(52) U.S. Cl.
CPC .................. *A61C 5/66* (2017.02); *A61C 1/12* (2013.01); *A61C 5/60* (2017.02); *A61C 5/68* (2017.02);
(Continued)

(58) Field of Classification Search
CPC .... A61C 1/12; A61C 5/60; A61C 5/66; A61C 5/68; A61C 19/005; B01F 3/1221;
(Continued)

(56) References Cited

U.S. PATENT DOCUMENTS 1,665,260 A      4/1928 Grunn
2,533,806 A  *  12/1950 Holzapfel ............ B65D 25/087
                                                  206/221
(Continued)

FOREIGN PATENT DOCUMENTS

CN         1984616 A      6/2007
CN       101304927 A     11/2008
(Continued)

OTHER PUBLICATIONS

English-language translation of JP Office Action for JP Application No. 2017-541866, dated Apr. 20, 2018, 1 page.
(Continued)

*Primary Examiner* — Luan K Bui
(74) *Attorney, Agent, or Firm* — Blank Rome LLP (57) ABSTRACT

The invention relates to a capsule (3) for producing a composition, particularly for dental care, comprising an enclosure (6) provided with at least two compartments (8), the number of compartments corresponding to the number of components to be mixed, and at least one wall (10) for isolating the components, said wall (10) being provided to isolate the components form each other in storage mode, and to allow fluidic communication between the compartments (8) in mixing mode, said capsule also comprising a driving rod (2), one end of which is designed in compliance with the ISO 1797 standard, for removable attachment to a hand-held part (1).

11 Claims, 6 Drawing Sheets

(51) Int. Cl.

| | | |
|---|---|---|
| A61C 1/12 | (2006.01) | |
| A61C 5/68 | (2017.01) | |
| A61C 5/60 | (2017.01) | |
| B01F 3/12 | (2006.01) | |
| B01F 7/00 | (2006.01) | |
| B01F 13/00 | (2006.01) | |
| B01F 15/00 | (2006.01) | |
| A61C 19/00 | (2006.01) | |

(52) U.S. Cl.
CPC .......... *A61C 19/005* (2013.01); *B01F 3/1221* (2013.01); *B01F 7/00425* (2013.01); *B01F 13/002* (2013.01); *B01F 15/0087* (2013.01); *B01F 2215/0027* (2013.01)

(58) Field of Classification Search
CPC ................ B01F 7/00425; B01F 13/002; B01F 15/0087; B01F 2215/0027; B65D 25/08; B65D 81/3238; B65D 81/3266
USPC ........ 206/219–221, 63.5, 368; 366/197, 199, 366/206
See application file for complete search history.

(56) References Cited

U.S. PATENT DOCUMENTS

| | | | | |
|---|---|---|---|---|
| 2,729,328 | A * | 1/1956 | Van Rossem | B65D 77/048 106/38.51 |
| 3,640,510 | A | 2/1972 | Lea | |
| 3,715,806 | A | 2/1973 | Warden et al. | |
| 3,814,387 | A | 6/1974 | Ahrens et al. | |
| 3,881,868 | A * | 5/1975 | Duke | A45D 44/18 206/209.1 |
| 3,965,578 | A | 6/1976 | Warden et al. | |
| 4,138,816 | A | 2/1979 | Warden et al. | |
| 4,277,184 | A | 7/1981 | Solomon | |
| 4,557,376 | A * | 12/1985 | Probst | B65D 81/32 206/219 |
| 4,808,184 | A | 2/1989 | Tepic | |
| 5,746,313 | A * | 5/1998 | Wilson | A61C 5/66 206/220 |
| 6,186,971 | B1 * | 2/2001 | Naughton | A45D 29/007 206/210 |
| 6,846,300 | B2 | 1/2005 | Hörth et al. | |
| 7,591,221 | B2 * | 9/2009 | Ho | A47J 43/24 206/219 |
| 7,922,486 | B2 | 4/2011 | Pauser et al. | |
| 8,062,682 | B2 | 11/2011 | Mandralis et al. | |
| 8,747,009 | B2 | 6/2014 | Lee | |
| 8,794,433 | B2 | 8/2014 | Peuker et al. | |
| 2006/0093424 | A1 * | 5/2006 | Tsaur | A61M 35/003 401/49 |
| 2006/0116657 | A1 | 6/2006 | Schmid | |
| 2013/0148467 | A1 * | 6/2013 | Swader | B01F 7/165 366/198 |
| 2015/0101942 | A1 * | 4/2015 | Wu | B65D 81/3211 206/219 |
| 2017/0325923 | A1 | 11/2017 | Bensoussan | |
| 2018/0000560 | A1 | 1/2018 | Fehlmann | |

FOREIGN PATENT DOCUMENTS

| | | |
|---|---|---|
| CN | 102811644 A | 12/2012 |
| DE | 2736928 A1 | 3/1979 |
| DE | 19638067 A1 | 3/1998 |
| EP | 0077150 A1 | 4/1983 |
| EP | 1029513 | 8/2000 |
| EP | 1029513 A2 | 8/2000 |
| EP | 1344500 A1 | 9/2003 |
| EP | 1577227 | 9/2005 |
| EP | 1577227 A1 | 9/2005 |
| FR | 2285110 | 4/1976 |
| FR | 2352555 A1 | 12/1977 |
| JP | S5176897 A | 7/1976 |
| JP | S5867255 A | 4/1983 |
| WO | WO-2016/125036 | 8/2016 |

OTHER PUBLICATIONS

Rule 92bis Change Request, dated Apr. 4, 2017, 2 pages.
Rule 306 Notification of Change, dated Apr. 10, 2017, 1 page.
Complaint with the Federal Patent Court, dated Dec. 22, 2017, 54 pages.
Ruling dated Dec. 29, 2017 from the Federal Patent Court, 20 pages.
3rd Party Submission filed in U.S. Appl. No. 15/667,501, dated Jun. 11, 2018, 12 pages.
International Search Report for PCT/IB2016/050284, dated Jun. 1, 2016, 2 pages.

* cited by examiner

MIXING CAPSULE FOR DENTAL MATERIAL, AND METHOD FOR PRODUCING DENTAL MATERIAL

RELATED APPLICATIONS

This application is a national phase of PCT/IB2016/050284, filed on Jan. 21, 2016, which claims the benefit of Swiss Application No. CH 00145/15, filed on Feb. 4, 2015. The entire contents of these applications are incorporated herein by reference.

TECHNICAL FIELD OF THE INVENTION

The present invention relates to a capsule for the preparation of a mixture, in particular for dental care, which can be connected in a standard manner to an instrument by means of its specific connecting piece. The present invention also relates to a method for preparing dental material.

STATE OF THE PRIOR ART

Faced with the reality of the oral/dental health needs of individuals, the dental surgeon is brought to master a wide variety of treatments on patients.

For example, many treatments require the application of dental materials, such as dental cements, clay, polymers, resins, composites etc., for example for sealing a dental prosthesis, filling the remains of prepared teeth, replacing the missing parts of teeth, as mechanical support, cavity protective base, etc. For certain operations, the patient's blood needs to be mixed with bone graft material. Many dental materials must be prepared shortly before the application by mixing two components. For example, water-based cements must be prepared by mixing the cement and water just prior to the application of the cement to prevent it from hardening. The dentist or his assistant, using different tools such as glass plates and spatulas, conventionally prepares this mixture manually. Such a procedure certainly makes it possible to adapt the treatment for the patient, yet it has some disadvantages.

For example, the manual preparation of dental paste or cement for dental treatment presents recurring difficulties, such as the control of the precise dosage of the mixture necessary for the patient's specific oral/dental problem. It is thus difficult for the preparer to perfectly and reproducibly control the amount of water added to a water-based cement. The quality of the cement obtained therefore varies from one time to the next, and from one preparer to another.

Such a preparation, when it is obtained manually, can dry relatively quickly, forcing the practitioner to apply the preparation very quickly.

Moreover, the preparation of dental treatment by hand mixing has the disadvantage of not being homogeneous. The mixture obtained by artisanal intervention cannot be perfectly smooth. It may thus contain lumps, making the application of the paste difficult. This can result in uneven quality of the treatment.

Some dentists use a vibrator to mix the different components of the dental material. With the gradual abandonment of dental amalgams with mercury, however, such vibrators tend to disappear from dental offices and dentists no longer wish to equip themselves with such a relatively noisy and bulky apparatus.

Another inconvenience may be noted in the case of an artisanal preparation of a dental treatment. Manual mixing requires the use of different components designed to be combined to form mixtures. The various stages in the preparation of the mixtures also involve the use of different tools and instruments for mixing and working the paste or cement. Strict compliance with hygiene is difficult to achieve under such conditions. Various risks of contamination are therefore constantly present, despite the fact that the treatment is carried out in a sanitized environment.

Document U.S. Pat. No. 3,814,387 proposes an apparatus for dentists which allows the measuring and mixing of metal chips for the preparation of the amalgam paste, with a capsule containing previously measured components for the preparation of dental cements and synthetic dental resins, wherein the mixing is carried out in a single housing. Such a design is cumbersome, costly, and requires a specific material for this operation.

Application U.S. Pat. No. 3,640,510 relates to a machine for mixing components used in odontology. Since the removal of air or air bubbles is necessary in order to ensure a perfect result when the component is solidifying, the apparatus comprises a closed mixing vessel, a rotary stirring device and a vacuum pump for the rotary stirring device which is driven by a motor via a magnetic clutch. A switch is provided so that after a predetermined time the operation of the mixing apparatus is interrupted, while the vacuum pump however continues to operate. Such a concept is cumbersome, costly, and causes significant operating costs.

U.S. Pat. No. 1,665,260 describes a capsule for a dental product to be mixed. The capsule comprises a single compartment and is therefore not suitable for the mixtures of two components.

U.S. Pat. No. 3,715,806 discloses a capsule for a dental amalgam. The construction is suitable for straight hand pieces. The very elongated shape of the capsules may allow the mixture to be applied directly into the mouth, but makes their storage impractical. The components in the different compartments are difficult to mix with one another. Furthermore, the penetration rate of the first component into the second component is poorly controlled; this capsule is optionally adapted to the mixture of amalgams, but not to the mixture of dental cement, because it would immediately cause lumps that are very difficult to absorb later.

The invention provides various technical means to overcome these various disadvantages.

DISCLOSURE OF THE INVENTION

First of all, one aim of the invention is to solve at least in part the problems of the prior art mentioned above.

Another aim is to provide a system which makes it possible to produce mixtures of dental materials with an optimum and reproducible quality.

Another aim is to provide a system for the preparation of a dental mixture capable of ensuring high-level hygienic conditions.

Another aim of the invention is to design a container making it possible to facilitate the storage of the various components before their mixing.

To this end, the invention provides a capsule for the preparation of dental or surgical material obtained by mixing compounds before use, comprising an enclosure provided with at least two compartments intended for as many components to be mixed, and at least one isolation wall of the components. The isolation wall of the components is provided in storage mode to isolate the components from one another other, and in mixing mode, to allow fluid communication between the compartments. The capsule further comprises a drive rod adapted to a dental hand piece, for example a hand piece whose one end conforms to ISO 1797 for removable attachment with a hand piece. The capsule is also closed off in a sealed manner so that moisture cannot penetrate from the outside.

The invention is based in particular on the observation that the practice of modern dentistry often makes use of various instruments such as the contra-angle or the hand piece (collectively referred to hereinafter as "hand piece"). This hand piece includes a motor (micro-motor or turbine) for driving a removable tool at high speed, for example a dental drill, a drill bit, and the like. The tool is secured to the hand piece by means of a standard connection subject to standards, e.g. ISO 1797-1 (for shanks made of metallic materials) and ISO 1797-2 (plastic shanks), collectively referred to as "ISO 1797" standard.

According to one aspect of the invention, such a hand piece provided with a connection conforming to the ISO 1797 standard is used in a new way in order to mix the different components of a dental material.

The invention also makes it possible to improve the storage of the components before their mixing, by storing them in a single capsule provided with different compartments.

The capsule may contain various components for the preparation of different mixtures; for example different types of cements, variable proportions of water and cement, or other components. The number of components may be equal to or greater than two.

Sets of capsules containing different components may be proposed, allowing the dental surgeon to select a particular mixture simply by selecting a capsule.

The invention thus enables a simple, rapid and clean implementation.

The capsule comprises compartments arranged concentrically.

The insulating wall between the compartments may be a disc positioned and dimensioned so as to cover the surface occupied by the assembly of the concentric compartments.

According to an advantageous embodiment, the compartments of the capsule can also be arranged side by side, the insulating wall between the components being a removable, tearable or deformable membrane.

According to another embodiment of the invention, the capsule comprises a plurality of mixing arms arranged so as to dip into the mixture to be mixed when the capsule is in mixing mode.

According to an advantageous variant, the capsule comprises an Archimedean screw in fluid communication with the base of one of the compartments and arranged to transport the component present in this compartment when the drive rod is rotated.

Advantageously, the drive rod is made of injected polymer.

Still advantageously, the cover/lid and the enclosure are made of injected SBS. Other materials may be considered.

According to an advantageous embodiment, the capsule comprises a bayonet lock arranged to position the cover/lid in three positions that can be chosen, namely:
a closed position;
a mixing position;
a position where the lid is removed.

According to another embodiment, the lid is held on the enclosure without bayonet closing, for example by means of adhesive tape.

Advantageously, the capsule is specifically adapted to the storage and preparation of dental cement.

Alternatively, the capsule is specifically adapted for the storage and preparation of a composition for plastic surgery.

According to another variant embodiment, the capsule is specifically adapted for the storage and preparation of a composition for pedicure care.

According to another variant embodiment, the capsule is specifically adapted for the storage and preparation of a composition for orthopaedic interventions.

The present invention also relates to a process for the preparation of dental material by means of such a capsule.

DESCRIPTION OF THE FIGURES

All the details for the execution of the invention are given in the description which follows, supplemented by FIGS. 1A to 6B presented solely by way of non-limiting examples, and in which.

DETAILED DESCRIPTION OF THE INVENTION

The capsule for dental care 3 illustrated in the figures is intended to accommodate various components in order to mix them at the time of use in order to obtain a dental material, for example a paste, specifically adapted to the oral/dental health of each of the patients.

Figure 1A:
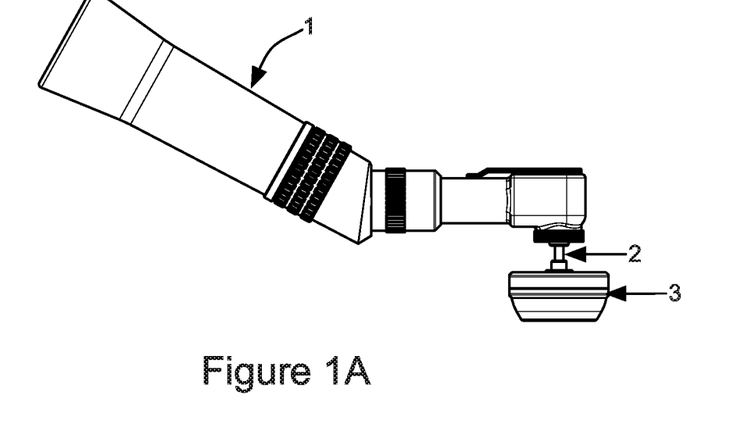
FIG. 1A is an elevational view of the hand piece connected to the preparation capsule for dental care.
Figure 1B:
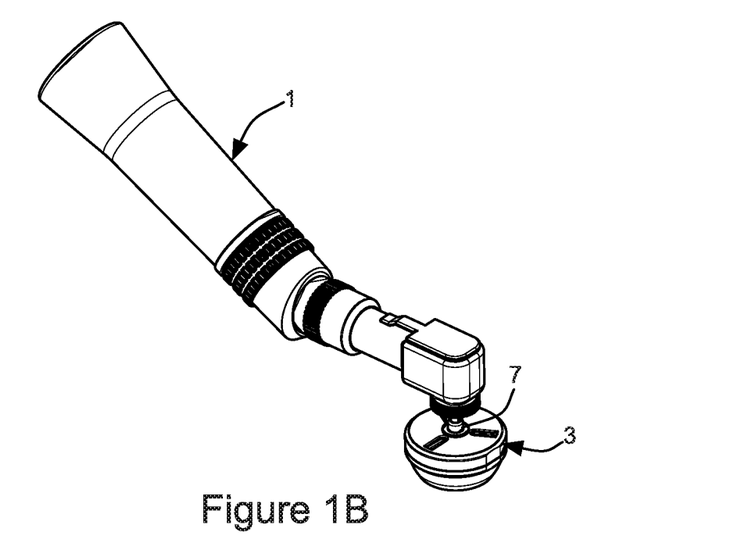
FIG. 1B is a perspective illustration of the hand piece connected to the preparation capsule for dental care.

FIGS. 1A and 1B show the capsule 3 for storing and preparing dental treatment components when it is connected to a hand piece (in this case a contra-angle) 1 via a standard shank 2.

Figure 2A:
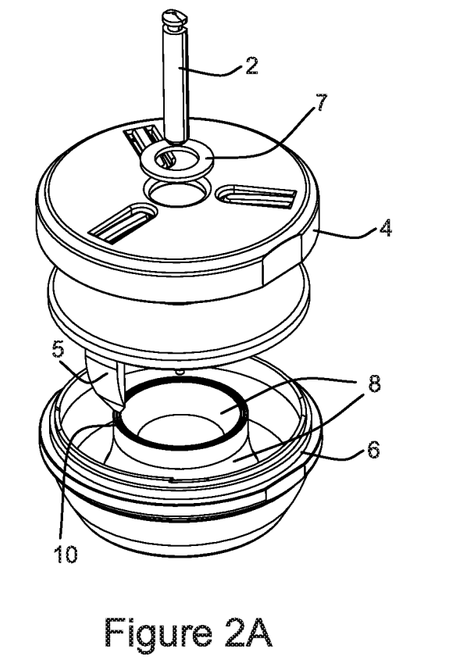
FIG. 2A is an exploded perspective representation of the constituent elements of the capsule.
Figure 2B:
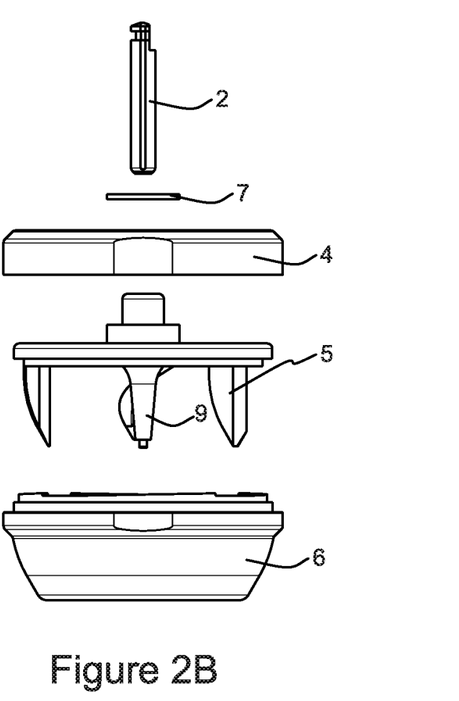
FIG. 2B is an elevational illustration of the constituent elements of the capsule before assembly.

FIGS. 2A and 2B illustrate by means of exploded views the various components of the capsule 3. The capsule 3 is thus constituted by an enclosure 6 within which the mixture can be made. The enclosure 6 is subdivided into two compartments 8 isolated from one another. One is intended to contain a first component, for example a powder component, and the other is destined for storing a second component, for example a liquid component. Such an arrangement of compartments makes it possible to dose the components very precisely according to the quantities desired to obtain a preparation adapted to a particular problem. These components are isolated from one another in storage mode, before the capsule 3 is used by the dentist. The components will then be brought into contact with one another in mixing mode, when the capsule 3 is driven by the rotation of the shank 2 thanks to the hand piece 1.

Figure 2C:
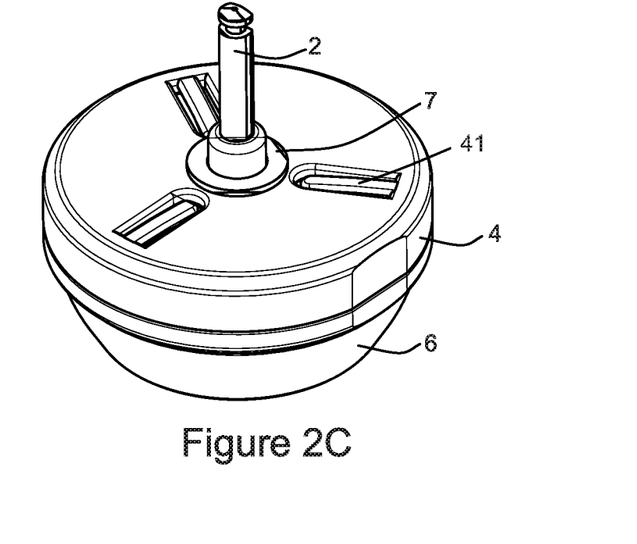
FIG. 2C represents in perspective the capsule after assembly, which is connected to the hand piece shank before use.

FIG. 2C makes it possible to visualize the capsule 3 in perspective when it is ready to be used. In this illustration, the standardized hand piece shank 2 is inserted into the capsule so that it can be operated with the hand piece.

Figure 3A:
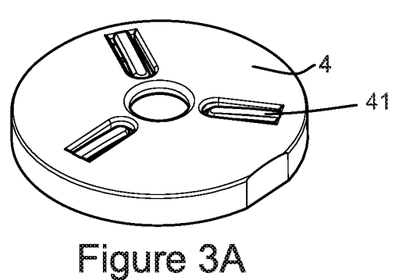
FIG. 3A illustrates in perspective a lid.
Figure 3B:
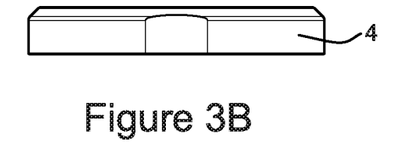
FIG. 3B is an elevational representation of the same lid.

FIGS. 3A and 3B show the outer part 4 of the lid of the capsule 4. It enables the components to be kept in the capsule during mixing, but also the sterilization of the stored components to be preserved. The edge of the lid has two flats for holding it with a tool, for example a combination wrench, to open the lid in order to access the mixture. In this figure openings can also be seen, in this example three radial openings, which make it possible to lift the internal part 5 of the lid and to ensure a pressure on this internal part.

FIGS. 4A, 4B, 4C and 6A show the internal part of the lid 5 seen from below, when it is integrated with the external part 4. It can be seen in these views that this part forms helical blades and comprises two mixing arms 5 which penetrate into one of the compartments and make it possible to mix the different components when these arms are rotated with respect to the enclosure 6 of the capsule thanks to the hand piece. The lower face of the lid serves also as an isolating wall between the compartments 8, making it possible to avoid a transfer of a component during transport or storage of the capsule.

Figure 7:
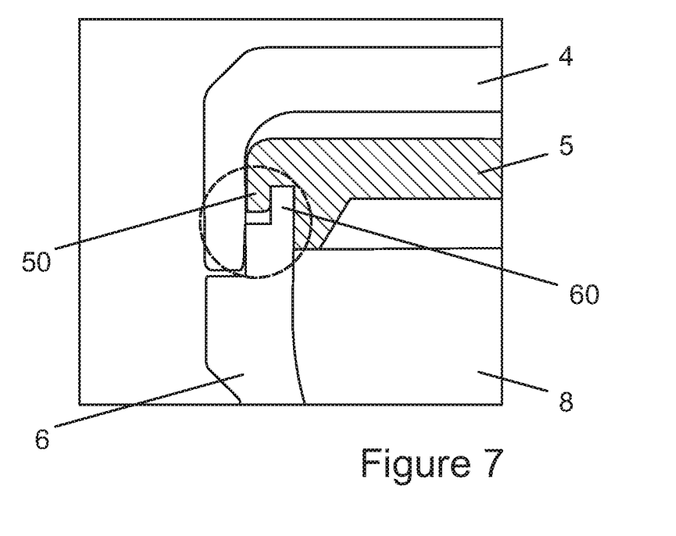
FIG. 7 is a cross-sectional view of a detail of the lid, the enclosure and the mixing arms.
Figure 8:
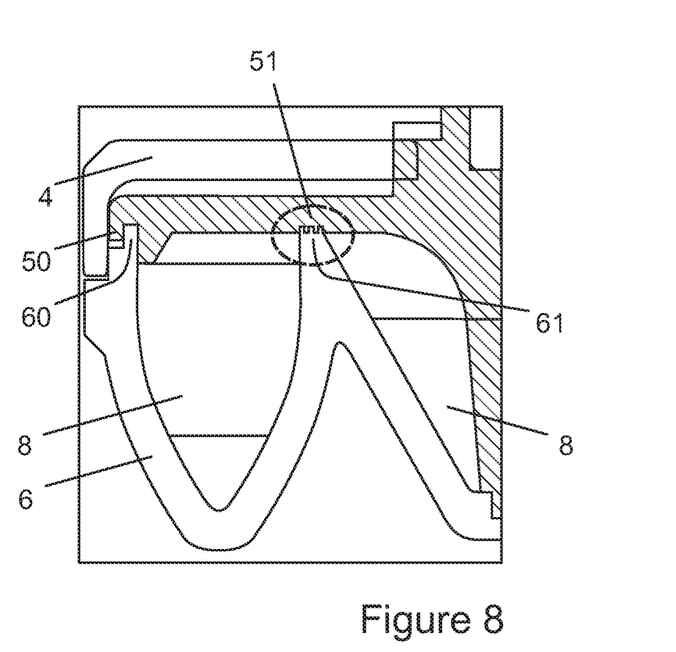
FIG. 8 is a cross-sectional view of a detail of the enclosure and of the arms mixers.

FIGS. 7 and 8 show how the inner part 5 of the lid closes in a leak-tight manner on the enclosure 6, avoiding the risk of passage of liquid or powder from one compartment to another or between a compartment and the outside of the capsule.

FIG. 7 shows the manner in which the sealing is obtained between the lower face of the internal part 5 of the lid and the outer edge of the enclosure 6. In this embodiment, an annular rim 50 under the internal part 5 of the cover 4, 5 engages against an annular bearing surface 60 on the external rim of the enclosure 6, so as to prevent exchanges of liquid or powder between the outside of the capsule and the outer compartment. At least one of the bearing surfaces 50 or 60 is made of plastic material or of another elastically deformable material so as to ensure leak-tightness. An annular seal may be provided to improve this tightness.

FIG. 8 shows the manner in which the cover 4 ensures the sealing between the two compartments of the enclosure 6. In this embodiment, the rim 61 between the two compartments comes to bear flexibly against a portion 51 of the lower face of the inner portion of the lid 5 so as to prevent water or powder infiltration of one compartment to the other of the enclosure. The flange 61 and/or the lower face 51 can be ribbed to ensure a tight fit. The flange 61 and/or the bottom face 51 may be made of an elastically deformable material so as to ensure leak-tightness. An annular seal may be provided to improve this seal.

A scraper could also be provided to be driven by the hand piece to scrape off the lid during mixing.

Figure 5A:
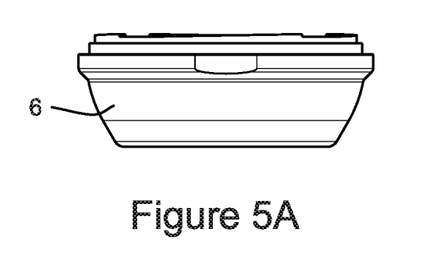
FIG. 5A shows an elevational view of the enclosure in which the mixture is made.
Figure 5B:
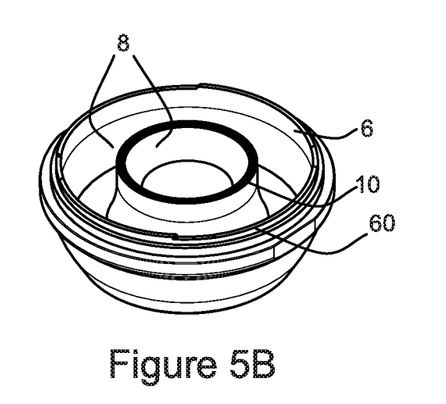
FIG. 5B illustrates the same mixing chamber according to a perspective representation.
Figure 6A:
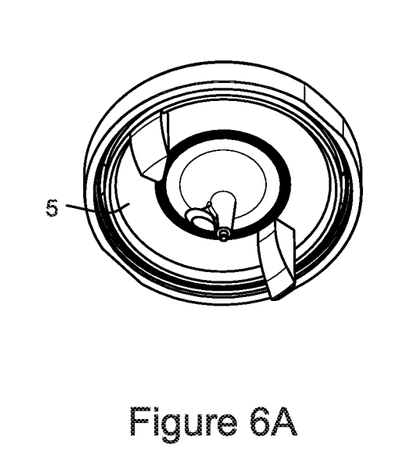
FIG. 6A is another perspective view of the lid with a plurality of mixing arms.
Figure 6B:
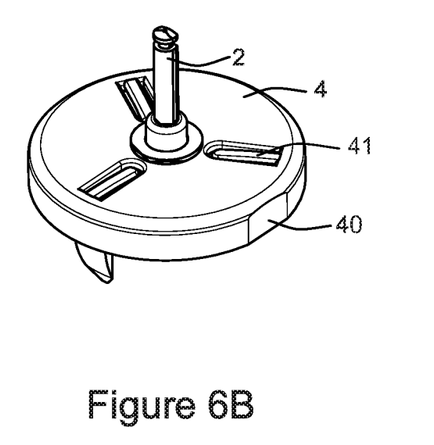
FIG. 6B is a perspective illustration of the lid of the capsule connected to the standardized shank of the hand piece.

FIGS. 5A and 5B show the enclosure 6 of the capsule, within which the various compartments 8 are arranged. In storage mode, the compartments 8 are isolated from each other thanks to the internal part of the lid 4 as described hereinafter.

In order to implement the various phases useful for the preparation and application of the prepared mixture, the lid 4.5 of the capsule is advantageously made in two parts. The inner part 5 carries the mixing arms. The external part 4 makes it possible to close the assembly and to adjust the relative position of the various elements as a function of the current phase. Thus, in the example illustrated, a bayonet closing makes it possible to select three positions, as follows:

a closed position, in which the various compartments are isolated from one another;
   a mixing position, where the components combine and mix;
   a position where the lid is removed to allow the practitioner to access the prepared dental material after mixing.

The passage from one position to the other is effected by turning the outer portion of the cover 4 with respect to the enclosure 6, for example by hand.

In another embodiment, the outer part of the lid 4 does not have to be pivoted to lift the helical blades and to allow the passage of liquid or powder from one compartment to the other. In this case, the inner part 5 of the lid (the helical blades) lifts by turning against the inclined edge of the enclosure 6 when it is rotated so as to dissociate the inner face of the lid 4,5 from the enclosure 6 and enable the mixing. In this case, the movement from the closed position to the mixing position takes place automatically when the driving rod is driven by the hand piece, which produces a displacement and possibly a deformation of the isolation wall.

Figure 9:
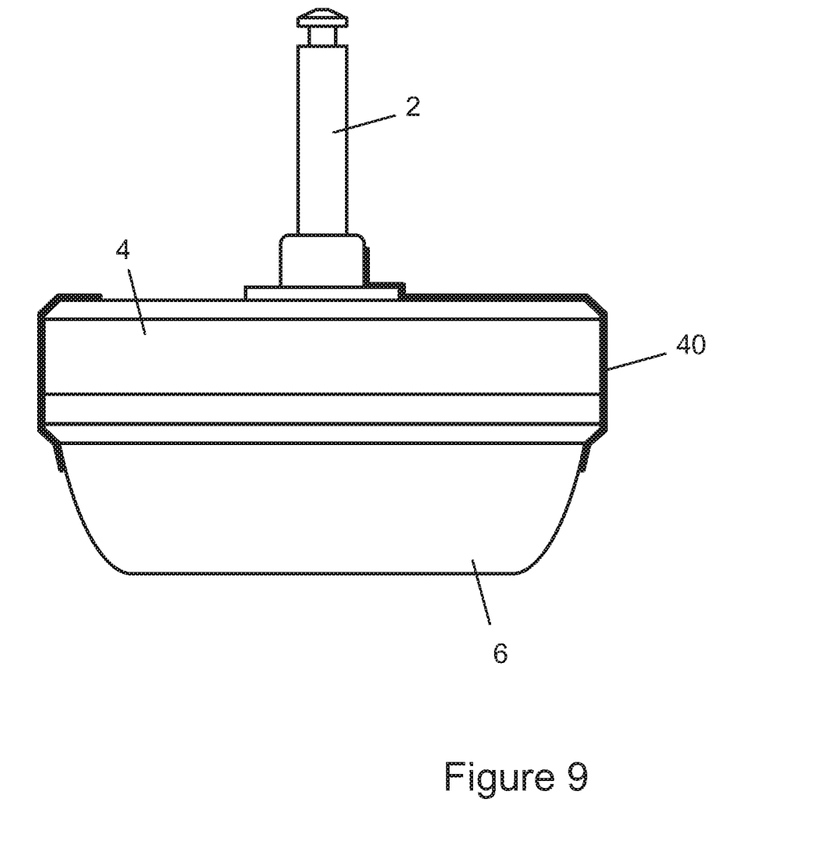
FIG. 9 is a side view of a capsule closed by a ribbon adhesive.

In another embodiment illustrated in FIG. 9, the lid is connected to the enclosure by means of an adhesive tape 40 in the closed position. It can pass into the mixing position and then into the retracted position by removing the adhesive and rotating it relative to the enclosure.

The adhesive tape 40, or other adhesive, may also cover the openings provided in the lid to prevent dust from entering.

This architecture allows the practitioner to prepare specific compositions without getting dirty. For this purpose, the dentist positions the bayonet lock in mixing mode in order to move the portion of the cover serving as an isolating wall between the compartments. He then fixes the capsule 3 to the hand piece 1, and actuates the latter to obtain the mixed preparation. If necessary, the enclosure 6 can be held during the drive of the mixing arms by hand or by means of a tool such as a fork wrench which makes it possible to hold the cover by flats provided for this purpose on the enclosure 6.

Upon the completion of the mixing, the dentist removes the lid and removes the preparation for immediate application.

Figure 4A:
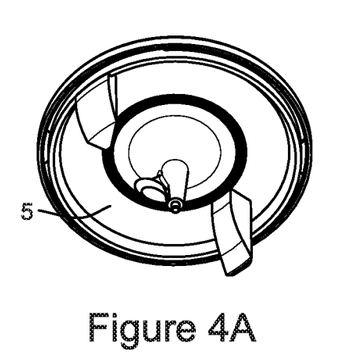
FIG. 4A is a perspective view of the lid with a plurality of mixing arms seen from below.
Figure 4B:
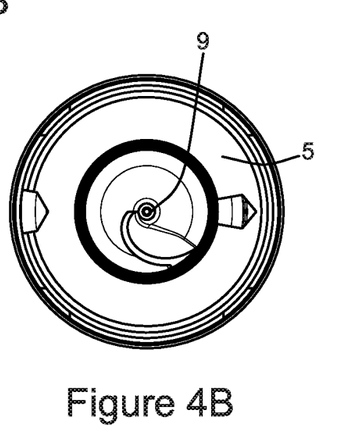
FIG. 4B is an illustration of the lid with a plurality of arms mixers from below.
Figure 4C:
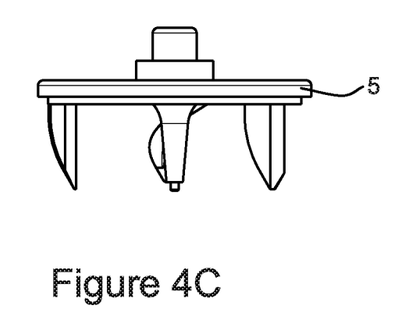
FIG. 4C is an elevational view of the lid with a plurality of mixing arms.

FIGS. 2B and 4C allow visualising an Archimedean screw 9 provided under the inner part of the cover 4. The Archimedean screw 9 makes it possible to gradually raise the component, for example a liquid, contained in the central compartment in order to facilitate transfer to the peripheral compartment. The liquid then flows easily and gradually into the external compartment containing, for example, cement, in order to obtain a ready-to-apply mixture.

According to a variant (not shown), several capsules 3 can be paired, for example superimposed or juxtaposed, to allow several mixtures to be prepared simultaneously, or to prepare complex mixtures from several capsules.

The paste preparation can be obtained after fixing the capsule 3 to the hand piece 1, then actuating the hand piece 1 while holding the outside of the enclosure 6 to prevent any rotation of the latter. In this way, the hand piece only pivots the mixing arms 5. According to such an embodiment, the paste obtained is very homogeneous.

The capsules according to the invention allow the dentist to save time in the preparation of the treatment and to guarantee a strict hygiene in the preparation since it limits the risks of contamination. Furthermore, such an architecture does not require the use of tools other than the hand piece 1 and the shank 2 connected to the hand piece.

In another version, the lid integrates the shank 2 which is inserted into the hand piece. A replaceable and/or reusable shank can be used.

The shank 2 can be integrated into the capsule, or be reusable. It can, for example, be made of metal, or advantageously of reinforced polymer, for example of polymer reinforced with glass or carbon fibre.

The components can be stored and protected in the capsule prior to mixing. It is also possible to open the capsule before mixing, to add components therein or to modify their proportions, then to close the capsule in order to obtain a customized mix.

The system described above can advantageously be used in the field of odontology, since it has the advantage of rapidly preparing a dental preparation in a very hygienic manner. Another advantage lies in the fact that very precise pre-dosing is performed. This allows significant timesaving during the care preparation phase.

The invention described above can be interpreted more broadly, that is to say that the capsules 3 can be used for purposes other than that of dentistry, such as, for example, in the field of surgery, cosmetic surgery, orthodontics, etc.

The invention claimed is:

1. Capsule for preparing dental or surgical material obtained by mixing components prior to use, comprising:
    an enclosure provided with a plurality of compartments arranged concentrically and each of said plurality of compartments intended for storing one of said components to be mixed,
    a lid for closing the enclosure,
    at least one isolating wall for isolating the components from one another during storage and for enabling fluid communication between the compartments during mixing, wherein the isolating wall comprises a plurality of mixing arms arranged so as to dip into the mixture to be mixed and configured to rotate when the capsule is in mixing mode, and
    a drive rod whose one extremity allows a removable attachment to a hand piece.

2. Capsule according to claim 1, wherein the isolating wall between the compartments covers the surface occupied by all of the concentric compartments.

3. Capsule according to claim 2, wherein the isolating wall comprises a lower face bearing against a rim between said compartments.

4. Capsule according to claim 1, wherein the isolating wall is connected to the drive rod so as to be rotatable by said drive rod to mix the mixture to be mixed.

5. Capsule according to claim 4, wherein the isolating wall is further arranged to be liftable by said drive rod to mix the mixture to be mixed.

6. Capsule according to claim 1, comprising an Archimedean screw in fluid communication with one of the compartments and arranged to transport the component present in this compartment during a rotation of the drive rod.

7. Capsule according to claim 1, wherein the compartments are arranged side by side, with the isolating wall between the components comprising a removable, tearable or deformable membrane.

8. Capsule according to claim 1, wherein the drive rod is made of injected polymer.

9. Capsule according to claim 1, wherein the lid and the enclosure are of injected SBS.

10. Capsule according to claim 1, comprising a bayonet closing arranged to position the lid in two positions that can be chosen, namely:
    a closed position;
    a position where the lid is removed.

11. Capsule according to claim 1, comprising components for the preparation of dental cement.

* * * * *